US012726240B2

(12) United States Patent
Ye et al.

(10) Patent No.: US 12,726,240 B2
(45) Date of Patent: Sep. 1, 2026

(54) SIGNAL PROCESSING METHOD AND APPARATUS, NODE, STORAGE MEDIUM AND SYSTEM

(71) Applicant: ZTE CORPORATION, Shenzhen (CN)

(72) Inventors: Xinquan Ye, Shenzhen (CN); Yijian Chen, Shenzhen (CN); Guanghui Yu, Shenzhen (CN); Zhaohua Lu, Shenzhen (CN); Zhen He, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 230 days.

(21) Appl. No.: 18/562,635

(22) PCT Filed: Apr. 22, 2022

(86) PCT No.: PCT/CN2022/088400
§ 371 (c)(1),
(2) Date: Nov. 20, 2023

(87) PCT Pub. No.: WO2022/242417
PCT Pub. Date: Nov. 24, 2022

(65) Prior Publication Data

US 2024/0243783 A1 Jul. 18, 2024

(30) Foreign Application Priority Data

May 20, 2021 (CN) ......................... 202110552830.5

(51) Int. Cl.
*H04B 7/0413* (2017.01)
*H04W 72/044* (2023.01)
*H04W 72/1273* (2023.01)

(52) U.S. Cl.
CPC ........ *H04B 7/0413* (2013.01); *H04W 72/046* (2013.01); *H04W 72/1273* (2013.01)

(58) Field of Classification Search
CPC .............. H04B 7/0413; H04W 72/046; H04W 72/1273
(Continued)

(56) References Cited

U.S. PATENT DOCUMENTS

2015/0237571 A1 8/2015 Laraqui et al.
2018/0302950 A1* 10/2018 Min ...................... H04L 25/022

FOREIGN PATENT DOCUMENTS

CN 105265015 A 1/2016
CN 106714100 A 5/2017
(Continued)

OTHER PUBLICATIONS

Extended European Search Report in Application No. 22803741.2, dated Feb. 25, 2025, 14 pages.
(Continued)

*Primary Examiner* — Intekhaab A Siddiquee
(74) *Attorney, Agent, or Firm* — Morgan, Lewis & Bockius LLP

(57) ABSTRACT

Provided are a signal processing method and apparatus, a node, a storage medium and a system. The method includes: acquiring, by a P-bridge (PB), a first uplink processing signal and first indication information, where the first uplink processing signal is a signal obtained after a radio remote unit (RRU) performs first uplink processing on an uplink signal sent by user equipment (UE); performing, by the PB, second uplink processing on the first uplink processing signal according to the first indication information to obtain a second uplink processing signal; and sending, by the PB, the second uplink processing signal to a building baseband unit (BBU) for third uplink processing.

9 Claims, 3 Drawing Sheets

(58) Field of Classification Search
USPC .......................................................... 370/310
See application file for complete search history.

(56) References Cited

FOREIGN PATENT DOCUMENTS

| | | | | | |
|---|---|---|---|---|---|
| CN | 111385025 | A | * | 7/2020 | ....... H04B 10/25753 |
| CN | 111740768 | A | * | 10/2020 | .......... H04W 72/542 |
| WO | 2018094746 | A1 | | 5/2018 | |
| WO | 2019000341 | A1 | | 1/2019 | |
| WO | WO-2020192363 | A1 | * | 10/2020 | ........... H04L 5/0037 |

OTHER PUBLICATIONS

International Search Report in Application No. PCT/CN2022/088400, dated Jul. 6, 2022, 4 pages, including translation.

* cited by examiner

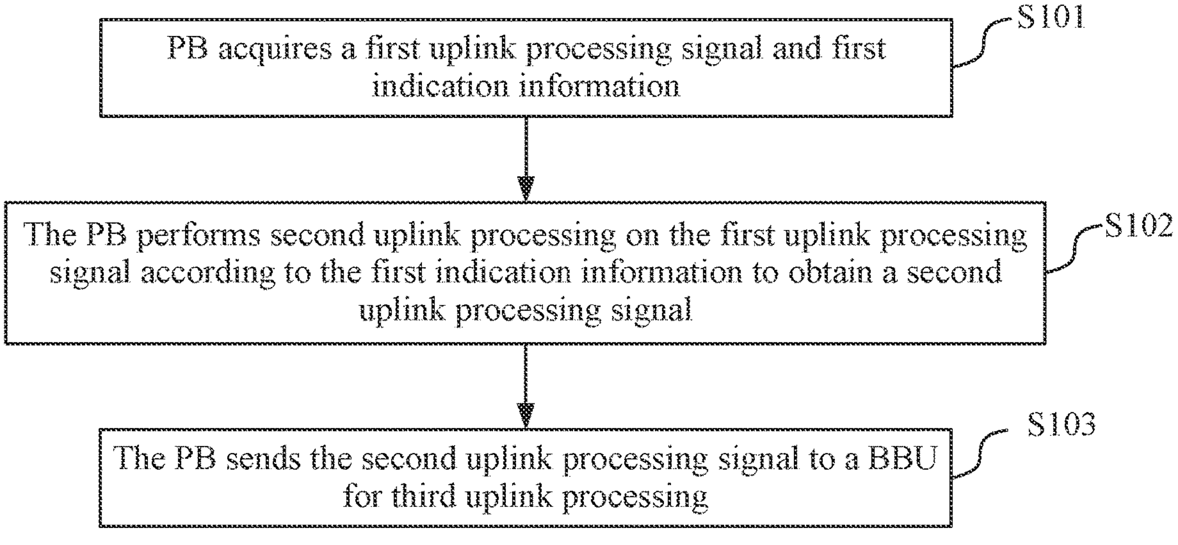

FIG. 1

A PB acquires a first downlink processing signal and second indication information

S201

The PB performs second downlink processing on the first downlink processing signal according to the second indication information to obtain a second downlink processing signal

S202

The PB sends the second downlink processing signal to an RRU for third downlink processing

SIGNAL PROCESSING METHOD AND APPARATUS, NODE, STORAGE MEDIUM AND SYSTEM

CROSS REFERENCE TO RELATED APPLICATIONS

This is a National Stage Application, filed under 35 U.S.C. 371, of International Patent Application No. PCT/CN2022/088400, filed on Apr. 22, 2022, which is based on and claims priority to Chinese Patent Application No. 202110552830.5 filed with the China National Intellectual Property Administration (CNIPA) on May 20, 2021, the disclosure of which is incorporated herein by reference in its entirety.

TECHNICAL FIELD

The present application relates to the technical field of wireless communication, for example, a signal processing method and apparatus, a node, a storage medium and a system.

BACKGROUND

Dense multiple-input multiple-output (dense MIMO), distributed multiple-input multiple-output (distributed MIMO) and cell-free massive multiple-input multiple-output (cell-free massive MIMO) are the potential key techniques in the multi-antenna direction of the beyond 5th generation (B5G)/6th generation (6G) mobile communication technology and receive more and more attention. In future dense MIMO, distributed MIMO and cell-free massive MIMO networks, multiple access points (APs) serve multiple sets of user equipment (UE) at the same time so that interferences are inevitably between multiple users. If a current indoor distributed base station is used for implementing the technology, in addition to a need to deploy more radio remote units (RRUs), P-bridges (PBs) and building baseband units (BBUs), enhancing functions of the RRUs or PBs or BBUs needs to be further taken into consideration.

SUMMARY

The present application provides a signal processing method and apparatus, a node, a storage medium and a system, which aims to implement a function of B5G/6G-oriented dense MIMO, distributed MIMO or cell-free massive MIMO through a change in the information processing mode on the premise that indoor distributed base station architecture in the related art is not changed.

Embodiments of the present application provide a signal processing method. The method includes the following.

A PB acquires a first uplink processing signal and first indication information.

The first uplink processing signal is a signal obtained after an RRU performs first uplink processing on an uplink signal sent by UE.

The PB performs second uplink processing on the first uplink processing signal according to the first indication information to obtain a second uplink processing signal.

The PB sends the second uplink processing signal to a BBU for third uplink processing.

Embodiments of the present application provide a signal processing method. The method includes the following.

A PB acquires a first downlink processing signal and second indication information.

The first downlink processing signal is a signal obtained after a BBU performs first downlink processing on a downlink signal of UE.

The PB performs second downlink processing on the first downlink processing signal according to the second indication information to obtain a second downlink processing signal.

The PB sends the second downlink processing signal to an RRU for third downlink processing.

Embodiments of the present application provide a signal processing apparatus. The apparatus includes an acquisition module, a processing module and a sending module.

The acquisition module is used for acquiring a first uplink processing signal and first indication information.

The first uplink processing signal is a signal obtained after an RRU performs first uplink processing on an uplink signal sent by UE.

The processing module is used for performing second uplink processing on the first uplink processing signal according to the first indication information to obtain a second uplink processing signal.

The sending module is used for sending the second uplink processing signal to a BBU for third uplink processing.

Embodiments of the present application provide a signal processing apparatus. The apparatus includes an acquisition module, a processing module and a sending module.

The acquisition module is used for acquiring a first downlink processing signal and second indication information.

The first downlink processing signal is a signal obtained after a BBU performs first downlink processing on a downlink signal of UE.

The processing module is used for performing second downlink processing on the first downlink processing signal according to the second indication information to obtain a second downlink processing signal.

The sending module is used for sending the second downlink processing signal to an RRU for third downlink processing.

Embodiments of the present application provide a communication node including a processor. The processor executes a computer program to implement the signal processing method provided in the embodiment of the present application.

Embodiments of the present application provide a readable and writeable storage medium storing a computer program. A processor executes the computer program to implement the signal processing method provided in the embodiment of the present application.

Embodiments of the present application provide a signal processing system. The system includes at least one UE, an RRU, a PB and a BBU.

Each UE is used for sending an uplink signal to the RRU, the RRU is used for processing the uplink signal sent by the each UE in a manner of first uplink processing to obtain a first uplink processing signal, the PB is used for performing second uplink processing on the first uplink processing signal sent by the RRU according to first indication information to obtain a second uplink processing signal, and the BBU is used for performing third uplink processing on the second uplink processing signal sent by the PB.

The BBU is further used for sending a first downlink signal processed in a manner of first downlink processing to the PB, the PB is further used for performing second downlink processing on the first downlink processing signal sent by the BBU according to second indication information to obtain a second downlink processing signal, the RRU is further used for processing the second downlink processing signal sent by the PB, and the each of the at least one set of UE is further used for receiving a third downlink processing signal processed by the RRU.

The embodiments of the present application provide the signal processing method and apparatus, the node, the storage medium and the system. The method includes: acquiring, by the PB, the first uplink processing signal and the first indication information, where the first uplink processing signal is the signal obtained after the RRU performs the first uplink processing on the uplink signal sent by the UE; performing, by the PB, the second uplink processing on the first uplink processing signal according to the first indication information to obtain the second uplink processing signal; and sending, by the PB, the second uplink processing signal to the BBU for the third uplink processing. In this manner, the function of the B5G/6G-oriented dense MIMO, distributed MIMO or cell-free massive MIMO can be implemented through the change in manner of information processing on the premise that the indoor distributed base station architecture in the related art is not changed.

BRIEF DESCRIPTION OF DRAWINGS

FIG. 1 is a flowchart of a signal processing method according to an embodiment of the present application.

FIG. 2 is a flowchart of another signal processing method according to an embodiment of the present application.

DETAILED DESCRIPTION

Figure 3:
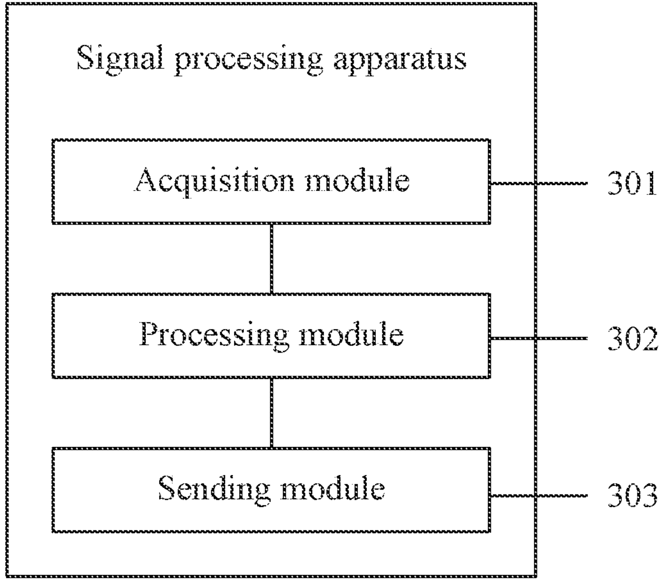
FIG. 3 is a structure diagram of a signal processing apparatus according to an embodiment of the present application.

To illustrate the object, technical solutions and advantages of the present application clearer, embodiments of the present application are described hereinafter in detail in conjunction with the drawings. It is to be noted that if not in collision, the embodiments of the present application and features therein may be combined with each other in any manner.

In addition, in the embodiments of the present application, words such as “optionally” or “exemplarily” are used for representing examples, illustrations or descriptions. Any embodiment or design described as “optionally” or “exemplarily” in the embodiments of the present application should not be explained as being more preferred or advantageous than other embodiments or designs. Rather, the use of the words “optionally” or “exemplarily” is intended to present related concepts in a specific manner.

To facilitate understanding of the solutions provided in the embodiments of the present application clearer, the related concepts involved in the embodiments of the present application are specifically construed below.

A typical indoor distributed base station may be divided into three parts according to functions, and those parts include a BBU, an RRU and a PB. The BBU implements functions such as coding, decoding, modulation and demodulation, the RRU implements functions such as up conversion, down conversion, power amplification, filtering, analog/digital (A/D) conversion and digital/analog (D/A) conversion, and the PB implements functions such as optoelectronic conversion, electro-optic conversion and power supply.

Precoding and power control are key technologies for dense MIMO or distributed MIMO or cell-free massive MIMO and receive more and more attention. In a current 5G indoor distributed base station, both precoding and power control are completed at the BBU side, and multiple APs in B5G/6G-oriented cell-free massive MIMO serve multiple sets of UE simultaneously, so that scales of a precoding parameter and a power control parameter are multiplied. In the case where a framework of the indoor distributed base station in the related art is not changed, in order to achieve the cell-free massive MIMO, in addition to a need to increase the number of RRUs or PBs or BBUs according to an actual situation, changing functions of the current BBUs or PBs or RRUs needs to be further taken into consideration. If the functions of the current BBUs or PBs or RRUs are not changed, requirements for data processing capabilities and fronthaul capacities of the current BBUs are further increased, and costs are further increased. In addition, complete centralization processing and scalability is further limited. Therefore, it may be taken into consideration that some functions of the BBUs are further placed in the PBs or the RRUs, making a further improvement in cost and scalability. At present, not any interaction information exists between different RRUs so that the RRUs can only acquire some information. When no large change occurs in morphology and function of the RRU side, it is almost impossible that functions such as precoding are moved to the RRU side. At present, the different RRUs are connected to one PB, and the one PB is connected to the BBU. The PB side can implement a mode of partial centralization processing, making a compromise between cost and performance. Therefore, it may be further taken into consideration that the functions of the PB side are increased.

An effect of the precoding is to eliminate interferences between channels and reduce the complexity of a receiver. Maximum-ratio combining (MRC) precoding, zero-forcing (ZF) precoding and minimum mean-square error (MMSE) precoding are three typical precoding schemes. The MRC precoding uses a conjugate of a channel matrix as precoding, which is also referred to as conjugate precoding, and $W_{MRC}=g^*$. The ZF precoding uses a pseudo-inverse of a channel matrix as precoding, and $W_{MRC}=g^*(gg^*)^{-1}$. The MRC only takes a desired signal into consideration but ignores an interference signal (including a noise), while the ZF takes weakening interferences between multiple users as much as possible into consideration but ignores a desired signal. The MMSE precoding comprehensively takes a desired signal and an interference into consideration and achieves a balance between the MRC precoding and the ZF precoding, and $W_{MMSE}=g^*(gg^*+\sigma^2 l)^{-1}\cdot g$, $\sigma^2$ and/denote a channel matrix, interference power and an identity matrix, respectively, and $(\ )^*$ and $(\ )^{-1}$ denote a conjugate of the matrix and an inversion of the matrix, respectively. The MRC precoding does not take interferences between multiple users into consideration so that each AP only needs to know channels of all sets of UE served by the each AP and does not need to know channels between all APs and all sets of UE. Therefore, the MRC precoding can be completely implemented through distribution with a minimum amount of signaling interaction. In addition, only a conjugate operation is needed, and a relatively complex inversion operation is not involved, so that computational complexity is low.

However, since the interferences between the multiple users are not taken into consideration, performance is relatively poor when the interferences are particularly large. The ZF precoding needs to take the interferences between the users into consideration and has intermediate performance. However, channels between all APs and all sets of UE need to be known, a manner of centralization processing is needed with an intermediate amount of signaling interaction. However, a relatively complex inversion operation is involved so that computational complexity is high. The MMSE precoding takes both the interference and desired signals into consideration and has the best performance. Not only channels between all APs and all sets of UE need to be known, but interference strengths between users are also needed with a maximum amount of signaling interaction, and a relatively complex inversion operation is involved, so that computational complexity is high.

After the precoding is determined, a power control parameter of UE served by each AP needs to be further determined. Many criteria are set for power control. Using downlink power control as an example, it may be ensured that power control parameters of different sets of UE served by the same AP are the same, power of different serving APs received by the same UE may be consistent. Alternatively, the power control parameter may be associated with a particular parameter, for example, the power control parameter is associated with a carrier frequency, an RRU channel identifier (ID) value and a UE ID value. In the cell-free massive MIMO, only if the precoding and the power control parameter are determined, can the gain and the interference be balanced.

Based on the above concepts, as shown in FIG. 1, embodiments of the present application provide a signal processing method. The method can be applied to a PB for processing an uplink signal of UE. The method includes, but is not limited to, the operations described below.

In S101, a PB acquires a first uplink processing signal and first indication information.

The first uplink processing signal in this step is a signal obtained after an RRU performs first uplink processing on an uplink signal sent by UE, that is, after the UE sends the uplink signal to the RRU, the RRU processes the received uplink signal to obtain the first uplink processing signal, and the RRU sends the first uplink processing signal to the PB.

Further, the uplink signal sent by the above UE may include a received signal including noise at the RRU side obtained after one or more uplink signals sent by the UE are superimposed after passing through respective channels, that is, a mixed uplink signal of the UE. Exemplarily, the uplink signal sent by the UE may include, but is not limited to, uplink data, control signaling and configuration information of the UE. A manner of first uplink processing performed on the received mixed uplink signal of the UE by the RRU may include at least one of power amplification, filtering, down conversion or A/D conversion.

Exemplarily, the first indication information may include at least one of a carrier frequency, an RRU channel ID or a UE ID.

In S102, the PB performs second uplink processing on the first uplink processing signal according to the first indication information to obtain a second uplink processing signal.

Exemplarily, the second uplink processing in the embodiments of the present application may include at least one of precoding, power control or combining. That is, after the PB processes the first uplink processing signal sent by the RRU with at least one of the precoding, the power control or the combining according to the first indication information, the second uplink processing signal is obtained.

In S103, the PB sends the second uplink processing signal to a BBU for third uplink processing.

The third uplink processing performed on the second uplink processing signal by the BBU may include at least one of decoding or demodulation.

The embodiments of the present application provide the signal processing method. The method includes: acquiring, by the PB, the first uplink processing signal and the first indication information, where the first uplink processing signal is the signal obtained after the RRU performs the first uplink processing on the uplink signal sent by the UE; performing, by the PB, the second uplink processing on the first uplink processing signal according to the first indication information to obtain the second uplink processing signal; and sending, by the PB, the second uplink processing signal to the BBU for the third uplink processing. In this manner, a function of B5G/6G-oriented dense MIMO, distributed MIMO or cell-free massive MIMO can be implemented through a change in manner of information processing on the premise that indoor distributed base station architecture in the related art is not changed.

In an example, in the above step S102, a process where the PB performs the second uplink processing on the first uplink processing signal according to the first indication information may include, but is not limited to, the manners described below.

PB performs the precoding on the first uplink processing signal according to the carrier frequency. For example, if the carrier frequency in the first indication information is less than or equal to 6 GHZ, the PB performs MRC precoding on the indicated first uplink processing signal. If the carrier frequency in the first indication information is greater than 6 GHZ, the PB performs ZF precoding on the indicated first uplink processing signal. If the carrier frequency in the first indication information is within a range of 1 GHz to 6 GHZ, the PB performs MMSE precoding on the indicated first uplink processing signal.

Alternatively, the PB performs the precoding on the first uplink processing signal according to the RRU channel ID. For example, if the RRU channel ID value in the first indication information is 1 or 2, the PB performs the MRC precoding on the indicated first uplink processing signal. If the RRU channel ID value in the first indication information is 3 or 4, the PB performs the ZF precoding on the indicated first uplink processing signal. If the RRU channel ID value in the first indication information is 5 or 6, the PB performs the MMSE precoding on the indicated first uplink processing signal.

Alternatively, the PB performs the precoding on the first uplink processing signal according to the UE ID. For example, if the UE ID value in the first indication information is 1 or 2, the PB performs the MRC precoding on the indicated first uplink processing signal. If the UE ID value in the first indication information is 3 or 4, the PB performs the ZF precoding on the indicated first uplink processing signal. If the UE ID value in the first indication information is 5 or 6, the PB performs the MMSE precoding on the indicated first uplink processing signal.

The above indicated first uplink processing signal may be understood as a signal indicated by the first indication information, that is, the PB performs the second uplink processing on the indicated corresponding first uplink processing signal according to a content in the first indication information. The following indicated first uplink processing signal or indicated first downlink processing signal indicates the same concept, which is not repeated here.

Optionally, in the above step S102, the process where the PB performs the second uplink processing on the first uplink processing signal according to the first indication information may include, but is not limited to, the manners described below.

The PB determines a power control parameter according to a correlation between the carrier frequency and the power control parameter and performs the power control on the first uplink processing signal according to the determined power control parameter, that is, the PB performs different power control strategies on different indicated first uplink processing signals according to the carrier frequency in the first indication information.

Alternatively, the PB determines a power control parameter according to a correlation between the RRU channel ID and the power control parameter and performs the power control on the first uplink processing signal according to the determined power control parameter, that is, the PB performs different power control strategies on different indicated first uplink processing signals according to the RRU channel ID value in the first indication information.

Alternatively, the PB determines a power control parameter according to a correlation between the UE ID and the power control parameter and performs the power control on the first uplink processing signal according to the determined power control parameter, that is, the PB performs different power control strategies on different indicated first uplink processing signals according to the UE ID in the first indication information.

Optionally, in the above step S102, the process where the PB performs the second uplink processing on the first uplink processing signal according to the first indication information may include, but is not limited to, the manners described below.

The PB performs the combining on the first uplink processing signal according to the carrier frequency. For example, the PB performs different manners of combining processing on different first uplink processing signals according to the carrier frequency in the received first indication information. The different manners of combining processing may include, but are not limited to, adding and subtracting operations, for example, two different first uplink processing signals having the same carrier frequency in the first indication information are added together.

Alternatively, the PB performs the combining on the first uplink processing signal according to the RRU channel ID. For example, the PB performs different manners of combining processing on first uplink processing signals of different RRU channel IDs according to the RRU channel ID in the received first indication information. The different manners of combination processing may include, but are not limited to, adding and subtracting operations. For example, two different first uplink processing signals indicated by an RRU channel ID1 and an RRU channel ID 2 are added together.

Alternatively, the PB performs the combining on the first uplink processing signal according to the UE ID.

FIG. 2 is a flowchart of a signal processing method according to an embodiment of the present application. The method can be applied to a PB for processing a downlink signal of UE. The method includes, but is not limited to, the steps described below.

In S201, a PB acquires a first downlink processing signal and second indication information.

The above first downlink processing signal is a signal obtained after a BBU performs first downlink processing on a downlink signal of UE. Here, the downlink signal of the UE may be one or more downlink signals of the UE to be sent, including, but not limited to, downlink data, control signaling and configuration information of the UE. Further, the first downlink processing performed on the downlink signal of the UE by the BBU may include at least one of coding or modulation.

Exemplarily, the second indication information may include at least one of a carrier frequency, an RRU channel ID or a UE ID.

In S202, the PB performs second downlink processing on the first downlink processing signal according to the second indication information to obtain a second downlink processing signal.

Exemplarily, the second indication information in the embodiments of the present application may include at least one of precoding, power control or combining. After the PB processes the first downlink processing signal sent by the BBU with at least one of the precoding, the power control or the combining according to the second indication information, the second downlink processing signal is obtained.

In S203, the PB sends the second downlink processing signal to an RRU for third downlink processing.

In the embodiments of the present application, the third downlink processing performed on the second downlink processing signal by the RRU may include at least one of power amplification, filtering, up conversion or D/A conversion.

The embodiments of the present application provide the signal processing method. The method includes: acquiring, by the PB, the first downlink processing signal and the second indication information, where the first downlink processing signal is the signal obtained after the BBU performs the first downlink processing on the downlink signal of the UE; performing, by the PB, the second downlink processing on the first downlink processing signal according to the second indication information to obtain the second downlink processing signal; and sending, by the PB, the second downlink processing signal to the RRU for the third downlink processing. In this manner, a function of B5G/6G-oriented dense MIMO, distributed MIMO or cell-free massive MIMO can be implemented through a change in manner of information processing on the premise that indoor distributed base station architecture in the related art is not changed.

In an example, in the above step S102, an implementation manner where the PB performs the second downlink processing on the first downlink processing signal according to the second indication information may include, but is not limited to, the manners described below.

The PB performs different precoding manners on different first downlink processing signals according to the carrier frequency. For example, if the carrier frequency in the second indication information is less than or equal to 6 GHz, the PB performs MRC precoding on the indicated first downlink processing signal. If the carrier frequency in the second indication information is greater than 6 GHZ, the PB performs ZF precoding on the indicated first downlink processing signal. If the carrier frequency in the second indication information is within a range of 1 GHz to 6 GHZ, the PB performs MMSE precoding on the indicated first downlink processing signal.

Alternatively, the PB performs different precoding manners on different first downlink processing signals according to the RRU channel ID. For example, if the RRU channel ID value in the second indication information is 1 or 2, the PB performs the MRC precoding on the indicated first downlink processing signal. If the RRU channel ID value in the second indication information is 3 or 4, the PB performs the ZF precoding on the indicated first downlink processing signal. If the RRU channel ID value in the second indication information is 5 or 6, the PB performs the MMSE precoding on the indicated first downlink processing signal.

Alternatively, the PB performs different precoding manners on different first downlink processing signals according to the UE ID. For example, if the UE ID value in the second indication information is 1 or 2, the PB performs the MRC precoding on the indicated first downlink processing signal. If the UE ID value in the second indication information is 3 or 4, the PB performs the ZF precoding on the indicated first downlink processing signal. If the UE ID value in the second indication information is 5 or 6, the PB performs the MMSE precoding on the indicated first downlink processing signal.

Optionally, in the above step S202, the implementation manner where the PB performs the second downlink processing on the first downlink processing signal according to the second indication information may include, but is not limited to, the manners described below.

The PB determines a power control parameter according to a correlation between the carrier frequency and the power control parameter and performs the power control on the first downlink processing signal according to the determined power control parameter, that is, the PB performs different power control strategies on different indicated first downlink processing signals according to the carrier frequency in the second indication information.

Alternatively, the PB determines a power control parameter according to a correlation between the RRU channel ID and the power control parameter and performs the power control on the first downlink processing signal according to the determined power control parameter, that is, the PB performs different power control strategies on different indicated first downlink processing signals according to the RRU channel ID in the second indication information.

Alternatively, the PB determines a power control parameter according to a correlation between the UE ID and the power control parameter and performs the power control on the first downlink processing signal according to the determined power control parameter, that is, the PB performs different power control strategies on different indicated first downlink processing signals according to the UE ID in the second indication information.

Optionally, in the above step S202, the implementation manner where the PB performs the second downlink processing on the first downlink processing signal according to the second indication information may include, but is not limited to, the manners described below.

The PB performs different manners of combining processing on different first downlink processing signals according to the carrier frequency. The different manners of combining processing include, but are not limited to, adding and subtracting operations, for example, two different first downlink processing signals having the same carrier frequency in the second indication information are added together.

Alternatively, the PB performs different manners of combining processing on different first downlink processing signals according to the RRU channel ID. The different manners of combining processing include, but are not limited to, adding and subtracting operations, for example, two different first downlink processing signals indicated by an RRU channel ID 1 and an RRU channel ID 2 are added together.

Alternatively, the PB performs different manners of combining processing on different first downlink processing signals according to the UE ID. The different manners of combining processing include, but are not limited to, adding and subtracting operations, for example, two different first downlink processing signals indicated by a UE ID 1 and a UE ID 2 are added together.

FIG. 3 is a structure diagram of a signal processing apparatus according to an embodiment of the present application. As shown in FIG. 3, the apparatus may include an acquisition module 301, a processing module 302 and a sending module 303.

The acquisition module is used for acquiring a first uplink processing signal and first indication information, where the first uplink processing signal is a signal obtained after an RRU performs first uplink processing on an uplink signal sent by UE.

The processing module is used for performing second uplink processing on the first uplink processing signal according to the first indication information to obtain a second uplink processing signal.

The sending module is used for sending the second uplink processing signal to a BBU for third uplink processing.

In an example, the first indication information includes at least one of a carrier frequency, an RRU channel ID or a UE ID, the second uplink processing includes at least one of precoding, power control or combining, the first uplink processing includes at least one of power amplification, filtering, down conversion or A/D conversion, and the third uplink processing includes at least one of decoding or demodulation.

In an example, the processing module is used for performing the precoding on the first uplink processing signal according to the carrier frequency, or performing the precoding on the first uplink processing signal according to the RRU channel ID, or performing the precoding on the first uplink processing signal according to the UE ID.

In an example, the processing module is used for determining a power control parameter according to a correlation between the carrier frequency and the power control parameter and performing the power control on the first uplink processing signal according to the determined power control parameter, or determining a power control parameter according to a correlation between the RRU channel ID and the power control parameter and performing the power control on the first uplink processing signal according to the determined power control parameter, or determining a power control parameter according to a correlation between the UE ID and the power control parameter and performing the power control on the first uplink processing signal according to the determined power control parameter.

In an example, the processing module is used for performing the combining on the first uplink processing signal according to the carrier frequency, or performing the combining on the first uplink processing signal according to the RRU channel ID, or performing the combining on the first uplink processing signal according to the UE ID.

The signal processing apparatus provided in the present embodiment is used for implementing the signal processing method in the embodiment shown in FIG. 1. The implementation principles and technical effects are similar and are not repeated here.

Figure 4:
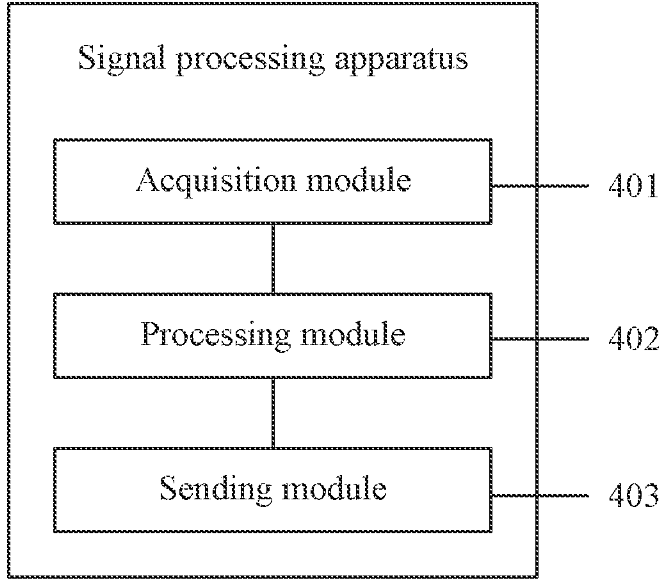
FIG. 4 is a structure diagram of another signal processing apparatus according to an embodiment of the present application.

FIG. 4 is a structure diagram of a signal processing apparatus according to an embodiment of the present application. As shown in FIG. 4, the apparatus may include an acquisition module 401, a processing module 402 and a sending module 403.

The acquisition module is used for acquiring a first downlink processing signal and second indication information, where the first downlink processing signal is a signal obtained after a BBU performs first downlink processing on a downlink signal of UE.

The processing module is used for performing second downlink processing on the first downlink processing signal according to the second indication information to obtain a second downlink processing signal.

The sending module is used for sending the second downlink processing signal to an RRU for third downlink processing.

In an example, the second indication information includes at least one of a carrier frequency, an RRU channel ID or a UE ID, the second downlink processing includes at least one of precoding, power control or combining, the first downlink processing includes at least one of coding or modulation, and the third downlink processing includes at least one of power amplification, filtering, up conversion or D/A conversion.

In an example, the processing module is used for performing the precoding on the first downlink processing signal according to the carrier frequency, or performing the precoding on the first downlink processing signal according to the RRU channel ID, or performing the precoding on the first downlink processing signal according to the UE ID.

In an example, the processing module is used for determining a power control parameter according to a correlation between the carrier frequency and the power control parameter and performing the power control on the first downlink processing signal according to the determined power control parameter, or determining a power control parameter according to a correlation between the RRU channel ID and the power control parameter and performing the power control on the first downlink processing signal according to the determined power control parameter, or determining a power control parameter according to a correlation between the UE ID and the power control parameter and performing the power control on the first downlink processing signal according to the determined power control parameter.

In an example, the processing module is used for performing the combining on the first downlink processing signal according to the carrier frequency, or performing the combining on the first downlink processing signal according to the RRU channel ID, or performing the combining on the first downlink processing signal according to the UE ID.

The signal processing apparatus provided in the present embodiment is used for implementing the signal processing method in the embodiment shown in FIG. 2. The implementation principles and technical effects are similar and are not repeated here.

Figure 5:
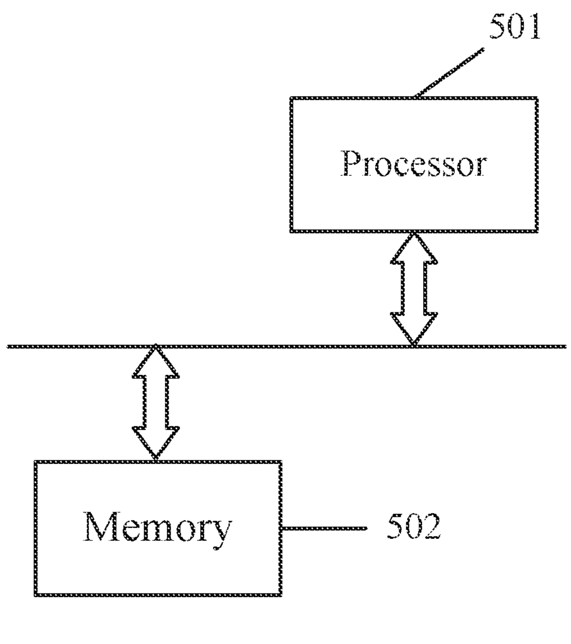
FIG. 5 is a structure diagram of a communication node according to an embodiment of the present application.

FIG. 5 is a structure diagram of a communication node according to an embodiment. As shown in FIG. 5, the node includes a processor 501 and a memory 502. The number of processors 501 in the node may be one or more, and one processor 501 is used as an example in FIG. 5. The processor 501 and the memory 502 in the node may be connected through a bus or in other manners. In FIG. 5, the connection through the bus is used as an example.

As a computer-readable storage medium, the memory 502 may be configured to store software programs, computer-executable programs and modules, such as program instructions/modules (for example, the acquisition module 301, the processing module 302 and the sending module 303 in the signal processing apparatus) corresponding to the signal processing method provided in the embodiment shown in FIG. 1 or FIG. 2 of the present application. The processor 501 performs the signal processing method by running the software programs, instructions and modules stored in the memory 502.

The memory 502 may mainly include a program storage region and a data storage region. The program storage region may store an operating system and an application program required by at least one function. The data storage region may store data created according to the use of a set-top box. Additionally, the memory 502 may include a high-speed random-access memory and may also include a nonvolatile memory, such as at least one magnetic disk memory, a flash memory or another nonvolatile solid-state memory.

In an example, if possible, the processor in the preceding node may perform the preceding signal processing method through a hardware circuit such as an internal logic circuit or a gate circuit.

Figure 6:
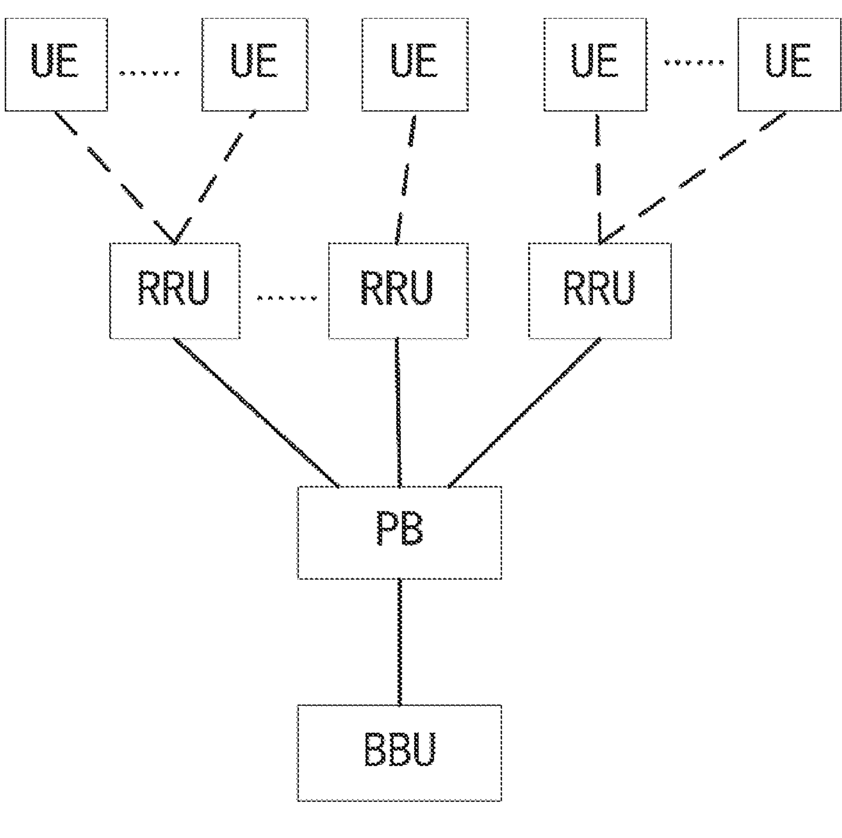
FIG. 6 is a schematic diagram of a signal processing system according to an embodiment of the present application.

FIG. 6 is a schematic diagram of a signal processing system according to an embodiment of the present application. As shown in FIG. 6, the system includes at least one set of UE, an RRU, a PB and a BBU.

The number of RRUs may be one or more, and multiple RRUs are used as an example in FIG. 6 for describing the above signal processing system. As shown in FIG. 6, one RRU can communicate wirelessly with one or more sets of UE. In FIG. 6, the dashed line represents wireless communication, and the solid line represents wired communication.

Each of the at least one set of UE is used for sending an uplink signal to the RRU, the RRU is used for processing the uplink signal sent by the each of the at least one set of UE in a manner of first uplink processing to obtain a first uplink processing signal, the PB is used for performing second uplink processing on the first uplink processing signal sent by the RRU according to first indication information to obtain a second uplink processing signal, and the BBU is used for performing third uplink processing on the second uplink processing signal sent by the PB.

Further, the BBU is further used for sending a first downlink signal processed in a manner of first downlink processing to the PB, the PB is further used for performing second downlink processing on the first downlink processing signal sent by the BBU according to second indication information to obtain a second downlink processing signal, the RRU is further used for processing the second downlink processing signal sent by the PB, and the each of the at least one set of UE is further used for receiving a third downlink processing signal processed by the RRU.

Each device in the above system may also be used for performing the related functions provided in the embodiments shown in FIGS. 1 and 2, which are not repeated here.

Embodiments of the present application further provide a storage medium configured for computer-readable and computer-writeable storage. The storage medium stores one or more programs executable by one or more processors to perform the signal processing method in the preceding embodiment.

It is to be understood by those of ordinary skill in the art that some or all steps in the preceding disclosed method and function modules/units in the device may be implemented as software, firmware, hardware and suitable combinations thereof.

In the hardware implementation, the division of the preceding function modules/units may not correspond to the division of physical components. For example, one physical component may have multiple functions, or one function or step may be performed jointly by several physical components. Some or all physical components are implementable as software executed by a processor such as a central processing unit, a digital signal processor or a microprocessor, are implementable as hardware, or are implementable as integrated circuits such as application-specific integrated circuits. Such software may be distributed on computer-readable media. The computer-readable media may include computer storage media (or non-transitory media) and communication media (or transitory media). As known to those of ordinary skill in the art, the term, the computer storage media, includes volatile and non-volatile as well as removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital video disk (DVD) or another optical disc storage, a magnetic cassette, a magnetic tape, disk storage or another magnetic storage apparatus, or any other medium that may be used for storing desired information and accessed by a computer. Moreover, as known to those of ordinary skill in the art, the communication media generally include computer-readable instructions, data structures, program modules, or other data in carriers or in modulated data signals transported in other transport mechanisms and may include any information delivery medium.

The preceding example embodiments of the present application are described with reference to the drawings and are not intended to limit the scope of the appended claims of the present application. Any modifications, equivalent replacements and improvements made by any person skilled in the art without departing from the scope and substantive content of the present application should be within the scope of the appended claims of the present application.

What is claimed is:

1. A signal processing method, performed by a P-bridge (PB) of a base station, wherein the base station comprises a radio remote unit (RRU), the PB, and a building baseband unit (BBU), wherein the method comprises-comprising:

acquiring, by the PB, a first uplink processing signal and first indication information, wherein the first uplink processing signal is a signal obtained after the RRU performs first uplink processing on an uplink signal sent by user equipment (UE);

performing, by the PB, second uplink processing on the first uplink processing signal according to the first indication information to obtain a second uplink processing signal; and sending, by the PB, the second uplink processing signal to the BBU for third uplink processing;

wherein the first indication information comprises at least one of a carrier frequency, a RRU channel identifier (ID), or a user equipment identifier (UE ID); and wherein the second uplink processing comprises precoding; and wherein the performing, by the PB, the second uplink processing on the first uplink processing signal according to the first indication information comprises:

performing, by the PB, the precoding on the first uplink processing signal according to the carrier frequency, wherein the PB performs different precoding manners on the first uplink processing signal according to the carrier frequency; or performing, by the PB, the precoding on the first uplink processing signal according to the RRU channel ID, wherein the PB performs different precoding manners on the first uplink processing signal according to the RRU channel ID; or performing, by the PB, the precoding on the first uplink processing signal according to the UE ID, wherein the PB performs different precoding manners on the first uplink processing signal according to the UE ID.

2. The method according to claim 1, wherein the first uplink processing comprises at least one of power amplification, filtering, down conversion or analog/digital (A/D) conversion; and wherein the third uplink processing comprises at least one of decoding or demodulation.

3. The method according to claim 2, wherein the second uplink processing further comprises combining, and wherein the performing, by the PB, the second uplink processing on the first uplink processing signal according to the first indication information comprises:

performing, by the PB, the combining on the first uplink processing signal according to the carrier frequency; or performing, by the PB, the combining on the first uplink processing signal according to the RRU channel ID; or performing, by the PB, the combining on the first uplink processing signal according to the UE ID.

4. A signal processing method, performed by a P-bridge (PB) of a base station, wherein the base station comprises a radio remote unit (RRU), the PB, and a building baseband unit (BBU), wherein the method comprises:

acquiring, by the PB, a first downlink processing signal and second indication information, wherein the first downlink processing signal is a signal obtained after the BBU performs first downlink processing on a downlink signal of user equipment (UE);

performing, by the PB, second downlink processing on the first downlink processing signal according to the second indication information to obtain a second downlink processing signal; and sending, by the PB, the second downlink processing signal to the RRU for third downlink processing;

wherein the second indication information comprises at least one of a carrier frequency, a RRU channel identifier (ID), or a user equipment identifier (UE ID); wherein the second downlink processing comprises precoding; and wherein the performing, by the PB, the second downlink processing on the first downlink processing signal according to the second indication information comprises:

performing, by the PB, the precoding on the first downlink processing signal according to the carrier frequency, wherein the PB performs different precoding manners on different first downlink processing signals according to the carrier frequency; or performing, by the PB, the precoding on the first downlink processing signal according to the RRU channel ID, wherein the PB performs different precoding manners on different first downlink processing signals according to the RRU channel ID; or performing, by the PB, the precoding on the first downlink processing signal according to the UE ID, wherein the PB performs different precoding manners on different first downlink processing signals according to the UE ID.

5. The method according to claim 4, wherein the first downlink processing comprises at least one of coding or modulation; and wherein the third downlink processing comprises at least one of power amplification, filtering, up conversion or digital/analog (D/A) conversion.

6. The method according to claim 5, wherein the second downlink processing further comprises combining, and wherein performing, by the PB, the second downlink processing on the first downlink processing signal according to the second indication information comprises:

performing, by the PB, the combining on the first downlink processing signal according to the carrier frequency; or performing, by the PB, the combining on the first downlink processing signal according to the RRU channel ID; or performing, by the PB, the combining on the first downlink processing signal according to the UE ID.

7. A communication node, comprising a processor, wherein the processor executes a computer program to implement the signal processing method according to claim 1.

8. A non-transitory storage medium, storing a computer program, wherein a processor executes the computer program to implement the signal processing method according to claim 1.

9. A signal processing system, comprising at least one user equipment (UE) and a base station, wherein the base station comprises: a radio remote unit (RRU), a P-bridge (PB) and a building baseband unit (BBU);

wherein each UE is configured to send an uplink signal to the RRU, the RRU is configured to process the uplink signal sent by the each UE in a manner of first uplink processing to obtain a first uplink processing signal, the PB is configured to perform second uplink processing on the first uplink processing signal sent by the RRU according to first indication information to obtain a second uplink processing signal, and the BBU is configured to perform third uplink processing on the second uplink processing signal sent by the PB; and the BBU is further configured to send a first downlink processing signal processed in a manner of first downlink processing to the PB, the PB is further configured to perform second downlink processing on the first downlink processing signal sent by the BBU according to second indication information to obtain a second downlink processing signal, the RRU is further configured to process the second downlink processing signal sent by the PB to obtain a third downlink processing signal, and each UE is further configured to receive the third downlink processing signal sent by the RRU;

wherein the first indication information comprises at least one of a carrier frequency, a RRU channel identifier (ID), or a user equipment identifier (UE ID); and wherein the second uplink processing comprises precoding; wherein the PB is configured to: perform the precoding on the first uplink processing signal according to the carrier frequency, wherein the PB performs different precoding manners on the first uplink processing signal according to the carrier frequency; or perform the precoding on the first uplink processing signal according to the RRU channel ID, wherein the PB performs different precoding manners on the first uplink processing signal according to the RRU channel ID; or perform the precoding on the first uplink processing signal according to the UE ID, wherein the PB performs different precoding manners on the first uplink processing signal according to the UE ID; and wherein the second indication information comprises at least one of the carrier frequency, the RRU channel ID, or the UE ID; wherein the second downlink processing comprises the precoding; and wherein the PB is configured to: perform the precoding on the first downlink processing signal according to the carrier frequency, wherein the PB performs different precoding manners on different first downlink processing signals according to the carrier frequency; or perform the precoding on the first downlink processing signal according to the RRU channel ID, wherein the PB performs different precoding manners on different first downlink processing signals according to the RRU channel ID; or perform the precoding on the first downlink processing signal according to the UE ID, wherein the PB performs different precoding manners on different first downlink processing signals according to the UE ID.

* * * * *